June 26, 1956   C. M. CHERRIER   2,751,777
GAS ANALYSIS APPARATUS
Filed March 6, 1952   2 Sheets-Sheet 1

INVENTOR.
CLAUDE MICHEL CHERRIER
BY
Dale A. Bauer
ATTORNEY

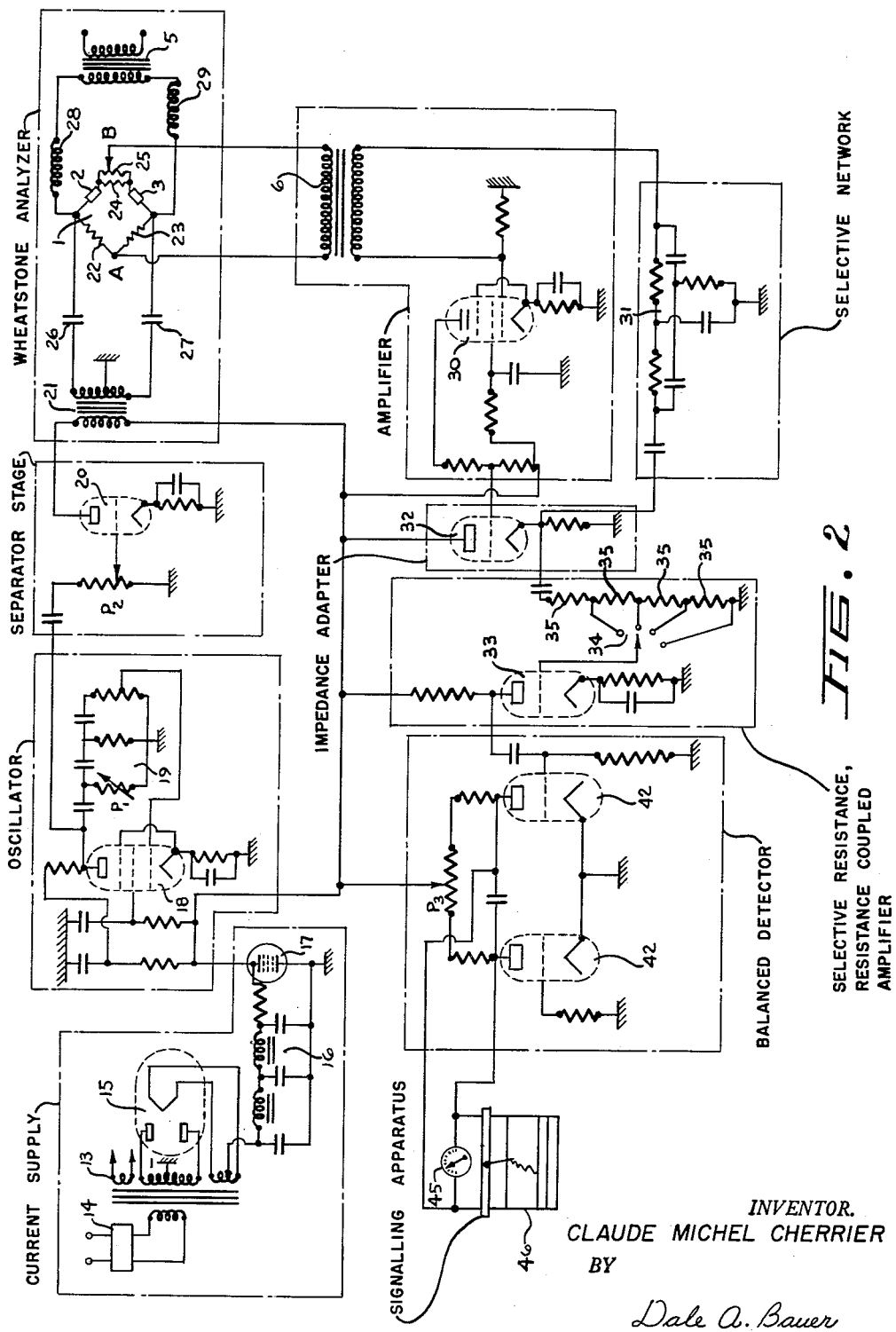

though the analysis of gas by the method based on thermal conductibility.

United States Patent Office 2,751,777
Patented June 26, 1956

2,751,777

GAS ANALYSIS APPARATUS

Claude Michel Cherrier, Saint-Mande, France, assignor to Societe Anonyme des Manufactures des Glaces et Produits Chimiques de Saint-Gobain, Chauny & Cirey, Paris, France Application March 6, 1952, Serial No. 275,079

Claims priority, application France March 8, 1951

5 Claims. (Cl. 73—27)

This invention relates to gas analysis by the method based on thermal conductibility.

The principle of that method is the following: the mixed gas to be analysed flows through a tube disposed in a constant temperature chamber. In the tube is a coil which can be electrically heated. The flow of the gas cools the coil and this cooling effect is a function of the thermal conductivity of the gas. When the gas contains a constituent for instance hydrogen of which the thermal conductivity is very high compared to that of the other constituent, for instance air, the cooling effect on the coil constitutes a measure of the content of the highly conductive constituent in the gas. The cooling effect on the coil is measured by the corresponding variation of its electrical resistance, in particular by means of a Wheatstone bridge. In order to improve the accuracy of the apparatus the variable electrical resistance of the analyser coil is compared to the electrical resistance of a second identical coil which is placed in the constant temperature chamber but out of the gas flow and which is heated by the same electric current as the analyser coil.

This invention is concerned with an improvement in such apparatus which adapts it for use in the analysis of gases having high thermal conductivity, and to improvements which increase the sensitivity and accuracy of such apparatus and produce superior results in the uses to which the former apparatus can be put.

The analysis of gas by the method of thermal-conductivity is difficult because of the smallness of the scales of resistances to be measured, and the construction of accurate apparatus is difficult, particularly when it is desired to analyze for traces of a particular gas, in which case the apparatus has been overly complex, fragile, and hard to operate because of its delicacy of manipulation, all of which result in imperfection. Another difficulty has arisen because of a variation of accuracy in the instrument when working with different quantities of gas, so that an instrument which is quite accurate at the analysis of a gas containing about 3% of the analysed component, may be relatively inaccurate when that component is present in only 0.5%.

It is an object of the invention to construct a gas analysis apparatus, operating on principles of different thermal-conductivity in different gases, without dependance upon percentage of the particular gas to be analysed.

It is also an object of the invention to improve the accuracy of apparatus operating on principles of different thermal-conductivity.

Another object is to improve the accuracy of the apparatus over a wider range and thus to increase its analytical flexibility so that it may be adapted to the analysis of more gases and to a more accurate analysis of all gases which are responsive to analysis by thermal-conductivity.

In the drawings,

Fig. 2 is a wiring diagram for a preferred form in the invention.

Figure 1:
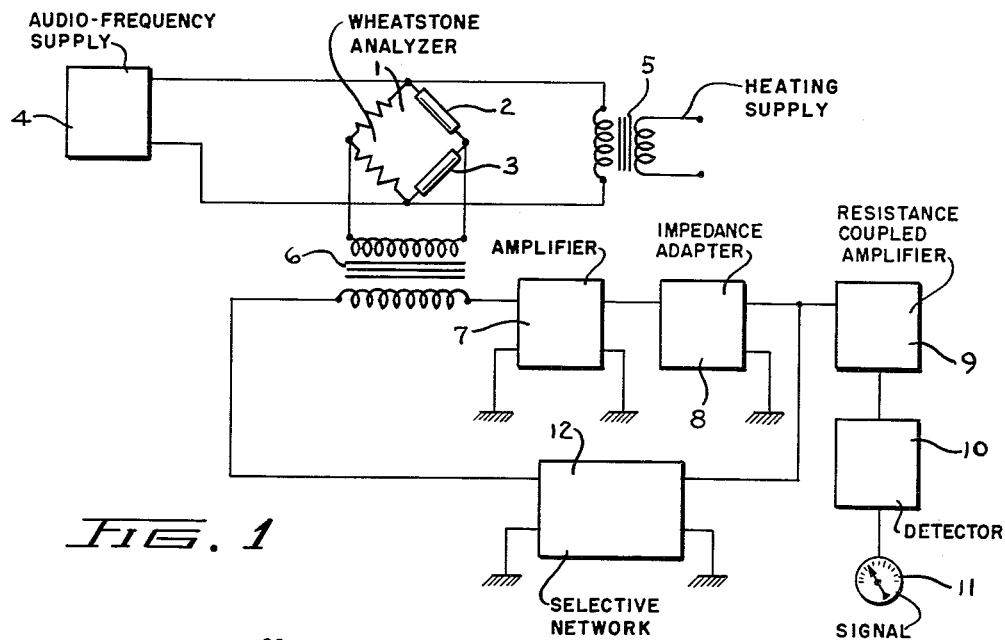
Fig. 1 is a schematic diagram showing the invention by circuits.

Referring first to Fig. 2, the section of the apparatus called current supply draws A. C. current through a voltage regulator 14 from the supply mains, not shown, of A. C. current, which may be of domestic lighting circuit type, and delivers it to the primary of a transformer 13, the secondary of which feeds a rectifying diode 15, the output of which passes through a filter 16 to a discharge lamp 17. The current supply circuit thus constitutes a stabilized power supply for the oscillator circuit which receives the output of the diode 17.

The oscillator circuit comprises a pentode 18 and tuned circuit 19, the entirety of which consists only of resistances and capacities, allowing great flexibility of adjustment. A variable potentiometer $P_1$ produces the audio-frequency desired.

The output of the oscillator is received in a separator stage matching the impedances and comprising a triode 20 and a potentiometer $P_2$ which establishes the amplitude of the sinusoidal wave provided by the oscillator. The output of the triode 20 passes to the primary of the transformer 21, which is connected to the output side of diode 17.

Up to this point, the apparatus of Fig. 2 is not novel and the different circuits above described constitute a stabilised audio-frequency supplying device to the Wheatstone bridge analyser.

It is in the Wheatstone analyser that the novel principles of the invention first appear. The opposite ends of the bridge 1 are supplied by a secondary of transformer 21, the central part of which is connected to ground and the ends of which are capacity coupled to the Wheatstone bridge, one arm of which has the fixed resistance 22, another of which the fixed resistance 23, the third arm of which comprises the resistance of analyzer tube 2 and the fourth arm of which comprises the resistance of comparator tube 3; the latter two arms are connected by a fixed resistor 24 and a variable potentiometer 25 connected in parallel to the resistance 24. The output of the bridge is at the ends of diagonal AB and feeds the primary of transformer 6. Current for heating the resistances of tubes 2 and 3 is supplied to the ends of the first diagonal by a transformer 5 connected to the same source of current supply as part 14, the secondary of which is connected through inductances 28, 29 to the ends of the first said diagonal. In the bridge employed in the following tests, the resistances 22, 23 were each on the order of 100 ohms. The resistance 24 and potentiometer 25 may be used to establish the zero of the scale of measurement. Because of this construction, the voltage between the points A and B can be reduced to zero before gas is flowed through the testing tube 2. The potentiometer allows a very precise setting.

Figure 3:
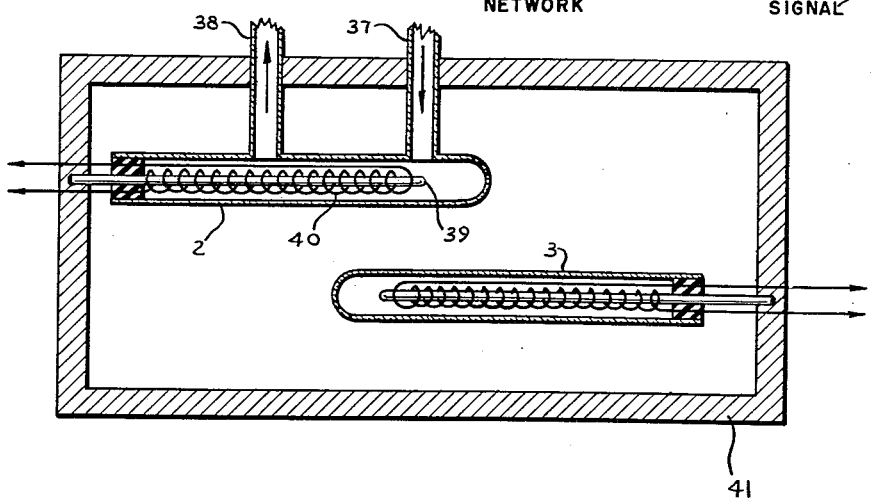
Fig. 3 is a vertical section through the novel analytical chamber.

Referring now to Fig. 3, a constant temperature chamber 41, which may be maintained at a fixed temperature by any satisfactory means such as a water bath, contains a tube 2 having branches 37, 38 through which the gas to be analyzed enters and leaves respectively. A glass rod is mounted in the wall of the chamber and wound about this rod is a resistance wire 40, the resistance of which changes rapidly with temperature. Such wires are well known. The ends of this resistance are connected as one, as the third, arm of the Wheatstone bridge described above. The chamber also contains another tube 3 which is sealed about a glass rod carrying a resistance identical with resistance 40 and this resistance is connected as the fourth arm of the bridge, as diagrammatically shown at 3 in Fig. 2.

The tube 3 is a comparator tube and it is used to standardize the apparatus for the analysis of the particular gas. For example, if it is desired to analyze air for the presence of excessive hydrogen, the tube 3 will be filled with normal air and sealed, the tube 2 will be filled with normal air, and the bridge will be brought to zero by means of potentiometer B. Thereafter gas will be flowed through line 37 to 38 and if the gas flowing through that line contains more hydrogen than the air used for standardization, there will be a flow of current at the output ends A, B of the bridge. This arises because the two metallic filaments are heated identically by the current from transformer 5. When the gaseous mixture to be analyzed passes through the tube 2, it will, if it contains a gas of superior heat conductibility such as hydrogen, cool the filament 40 proportionally to the quantity of high heat conducting gas contained in the mixture, inducing the resistance of the filament to change. For a given rate of gas flow, therefore, the measurement of this change in resistance furnishes a measurement of the amount of higher heat conductive gas present in the mixture. This works in reverse also, as when the contaminating gas is of lower conductibility than the comparator gas. Thus, the comparison of the ohmic resistances of the two filaments establishes a precise measurement of the quantity of analyzed gas present in the mixture. The apparatus is standardized anew whenever different gases are to be analyzed, the comparator gas being included in tube 3 and the mixture being passed, after the bridge is brought to zero, through tube 2.

The heating of the resistances in the tubes is accomplished by means of electric currents which are superposed upon the audio frequency currents passing through the resistances. The heating current can be direct or alternating, but it is easier to obtain uniform heating by alternating current, for example a 50 or 60 cycle by means of a transformer 5 of which the primary is connected to the current source; if need be, a voltage regulator can be interposed in the heating circuit. The heating current is arrested by the selective network of the amplifier circuit hereinafter described. The condensers 26 and 27 interrupt its progress toward the oscillator. In the same way passage of the audio frequency current toward the transformer 5, which would interfere with the accuracy of the apparatus, is prevented by the inductances 28 and 29.

The output of transformer 6 is directed on one side to the amplifier portion of the amplifier selective network circuit and on the other to the selective network. The amplifier is comprised mainly of a pentode tube 30 provided with resistances and capacities as indicated in the drawing and supplied at one grid from the output of diode 17, through a resistance. The plate of pentode 30 is coupled to the grid of the impedance matching circuit consisting mainly of triode 32, the plate of which is energized by the output of diode 17 and the cathode of which is resistance coupled to ground. The opposite end of the secondary of transformer 6 is connected to network 31 producing a negative feedback constituted by an arrangement of resistances and capacities of double T design. It is known that the gain of the amplifier, independent of the selected network is independent of the frequency. On the other hand, the selected negative feedback circuit has high impedance compared to that of the amplifier and for that reason there is interposed between the output of the amplifier and the selective network the cathode follower 32 which matches the impedances. The double T is capacity connected to the cathode 32. The selective network 31 opposes the passage of the voltage of fundamental frequency issuing from the amplifier, which is thus directed toward the signalling apparatus hereinafter described, while the voltages of frequencies different from the fundamental frequency easily pass the circuit 31 which returns them to the input of the amplifier in series with the voltage of the current issuing from the Wheatstone bridge. This produces an amplification of about 100 times for the fundamental frequency with a band width on the order of + or − 30 periods. The amplifier-selective network circuit and the impedance adapter is identical with that of the identified pending application S. N. 264,799 of January 3, 1952.

The flexibility and the accuracy of the apparatus is greatly enlarged by a selective-resistance, resistance-coupled amplifier which receives the output of the impedance adapter and the selective network. For example, to determine the percentage of hydrogen in a gas when that percentage is on the order of only 1% is very difficult, but is rendered determinable with accuracy by the triode 33, of resistance coupled amplifier type, which is connected to the output of the selective network and triode 32, through one or more of the resistances 35, employing the switch 34 to select a particular degree of resistance. This has the additional advantage of furnishing the apparatus with a plurality of different scales of equal sensitivity. By means of the switch 34, the grid of lamp 33 may receive a selected voltage so that the range of greatest sensitivity of the apparatus can be adapted to particular percentages of hydrogen (or other gas) which is present in the gas being analyzed. The plate of the triode 33 is connected to the output of diode 17 by a resistance. The output of the triode 33 is capacity coupled to the grid of one triode of a balanced detector containing two tubes 42, the cathodes of which are coupled to ground and the plates of which are supplied with current from diode 17 through a variable potentiometer $p_3$. The balanced detector circuit receives the amplified audio frequency waves which are applied to the grid of the first tube 42 of the balanced detector having two triodes. The grid of the second tube is grounded through a high resistance. The plates are connected to high tension issuing from tube 17 by potentiometer $p_3$. The plate currents of the triodes are received by signalling instruments of audible or visible type 45, 46. The signalling apparatus may include for example, a voltmeter 45 capable of measuring from, for instance, zero to 150 volts. A registering voltmeter 46 can be included, and an alarm relay for operating a bell or the like, not shown.

Figure 4:
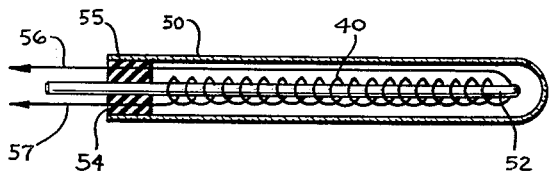
Fig. 4 is a sectional detail of an improved, chemically resistant resistor tube.

The gas to be analysed should be brought to the temperature of the enclosure 41 before being admitted to tube 2. This can be done by passing it through a coil of sufficient length inside the enclosure 41. When the gas or the mixture to be analyzed is corrosive for the wire resistance 40, the latter can be protected, as in Fig. 4 by means of thin glass cover 50 within which the resistance wire 40 is wound around glass rod 52 which is provided with a butt 53 for attachment to a fitting in the enclosure. The rod 52 has a flange 54 which is sealed in some satisfactory manner to the end 55 of the tube 50. The ends 56, 57 of the wire coil are sealed in the glass in a manner similar to that employed in making light bulbs. This structure is received inside tube 2 in place of the rod 39 and coil 40 of Fig. 3. The following figures give an idea of the accuracy of measurement which is possible with the apparatus of this invention.

*Example 1*

Employing an apparatus similar to that which is described in Fig. 2 but without the amplifier stage 33—34—35, the following results were obtained when analyzing a gas for hydrogen. The tube 3 was filled with air and air was admitted to tube 2 at identical temperature until the bridge was brought to zero. Then the gas to be analyzed, was brought to the same temperature and passed through tube 2. The content of hydrogen was progressively reduced and the following figures were obtained:

| Hydrogen content: | Voltage on meter 45 |
| --- | --- |
| 7% | 22 |
| 4.98% | 18 |
| 3.85% | 10 |

This showed increasing error as the quantity of hydrogen became less.

Example 2

Employing the apparatus herein described in Fig. 2, the following results were obtained in ranges where the accuracy of the apparatus of Example 1 was imperfect.

| Hydrogen content: | Voltage on meter 45 |
| --- | --- |
| 2.19% | 21 |
| 0.74% | 5.5 |

By selecting the value of the resistance 35, in order to increase the sensitivity of the amplifier 33, the sensitivity of measurement may be brought to about 30 volts for each percent of hydrogen, thus the measurement even of small percentages is no longer critical and delicate, but broad and accurate. The stability of the apparatus is such that during continuous employment for 24 hours the accuracy of the instrument has not varied over .5 volt; that is to say that the maximum variation registered on instrument 46 and due to the instrument itself, was not over .5 volt at any time.

The following parts of the combination contribute elements of superiority to it and combine to make it the most flexible and most accurate gas analyzer operating on electric principles. In addition several of the particular parts are dependent and separate, but not independent, inventions useful to improve other gas analyzers, for instance those working on paramagnetic principles.

The Wheatstone bridge compares the resistance of a heated resistance placed in the flow of gas to be analyzed with the resistance of an identically heated, identical resistance surrounded by a gas of known constitution. The bridge is supplied with audio frequency current through an oscillator, and serves an amplifier-selective network-impedance adapter circuit, which supplies a selective-resistance, resistance-coupled circuit discharging to a balanced detector which operates recording apparatus. The oscillator is of resistance-capacity type provided with a potentiometer for regulating its frequency. A separator stage between oscillator and bridge contains a triode to adapt the impedances of oscillator and bridge and a potentiometer which regulates the amplitude of the wave emitted by the oscillator. The bridge receives, simultaneously, analyzer current from the oscillator-separator and current for heating the comparative resistances in the bridge. The heating current is an alternating current at the frequency of the mains and it is transmitted to the bridge through a transformer, the primary of which is provided with a voltage regulator, not shown in the drawing. Inductances between the bridge and the heating current transformer interrupt the audio signals, and capacities (condensers) between the bridge and the separator stage interrupt the heating current. The bridge has its analytical arms connected by a resistance and a potentiometer in parallel, which provides precise control. The amplifier of the amplifier-selective network is of double T type composed of resistances and capacities which interrupt the basic oscillator frequency and introduce a counter-reaction in the whole range of other frequencies, and also arrest the heating current. A resistance coupled amplifier of selective resistance type is connected between the impedance adapter and the balanced detector, the selective resistances being connected to the grid of the amplifier tube, which by selection of resistances permits equal accuracy of analysis with widely different proportions of gas to be analyzed flowing through the analyzer tube.

The audio frequency current, amplified, is applied through a capacity to the grid of one tube of a double triode balanced detector of which the plates are potentiometer-coupled to the high tension of the current supply, the difference in the plate currents of the triodes supplying signalling apparatus. The analyzer tube contains a resistance, preferably a coil, connected as one arm of the bridge, and the comparator tube contains a like resistance, connected as the other arm of the bridge. Both tubes are preferably enclosed in a constant temperature chamber. When corrosive gases are to be analyzed, the analyzer resistances may be protected by corrosion resistant covers, of which thin glass is exemplary and satisfactory.

As many apparently widely different embodiments of the present invention may be made without departing from the spirit and scope thereof, it is to be understood that the invention is not limited to the specific embodiments.

What is claimed is:

1. Gas analysis apparatus including a Wheatstone bridge having four arms of which one includes a temperature responsive resistance and means to flow gas over it and another includes an identical resistance enclosed within a comparator gas, means to supply said bridge with heating current of low frequency, means to supply said bridge with measuring current of a separably higher frequency, both sources being connected to the bridge across both sensitive resistors, transformer means connected to the output of the bridge and to an indicating circuit including an amplifier and separating and filtering means which separate the said frequencies and return all frequencies except the measuring frequency to the input of the amplifier.

2. Gas analysis apparatus including a Wheatstone bridge having four arms of which one includes a temperature responsive resistance and means to flow gas over it and another includes an identical resistance enclosed within a comparator gas, means to supply said bridge with heating current of low frequency, means to supply said bridge with measuring current of a separably higher frequency, both sources being connected to the bridge across both sensitive resistors, resistance means interposed between the bridge and the low frequency current supply means, capacity means interposed between the bridge and the higher frequency current supply means, means to separate the measuring current frequencies emitted by the bridge from the heating current frequencies, and means to amplify the measuring current emissions of the bridge.

3. In gas analysis apparatus, a Wheatstone bridge, one arm of which includes a heat sensitive analyzer resistance, a second arm of which includes a heat sensitive comparator resistance, power supply means of low frequency heating type connected to said bridge, power supply means of separably higher frequency type connected to said bridge, both sources being connected to the bridge across both sensitive resistors, means to conduct the gas to be analyzed over the analyzer resistance, frequency selecting means connected to the output of the bridge separating the said higher frequencies from other frequencies, and indicating means operably supplied by said higher frequencies, and means to establish equal temperature in the media surrounding said analyzer and comparator resistances.

4. A gas analyzer for measuring the percentage of a gas in a flowing gas mixture comprising a Wheatstone bridge having 4 arms connected in series, a first source of current connected in shunt with the first and second of said arms, an amplifier circuit having an input connected in shunt with the second and the third of said arms and an output connected to a meter, said amplifier comprising a selective network producing a negative feedback for all frequencies different from the frequency of the said first source, whereby said meter receives only the frequency of the said first source, and a heating element in each of the first and second of said arms, means to heat said heating elements comprising a second source of current connected in shunt with the first and second of said arms, said first source of current being of higher frequency and the second of a lower frequency separable from the first frequency by the selective network, means exposing said first arm to a reference gas mixture and means exposing said second arm to said flowing gas mixture whereby said meter indicates a parameter of said percentage of said gas in the gas mixture.

5. A gas analyzer for measuring the percentage of a gas in a flowing gas mixture comprising a Wheatstone bridge having 4 arms connected in series, a first source of current connected in shunt with the first and second of said arms, an amplifier circuit having an input connected in shunt with the second and the third of said arms and an output connected to a meter, a heating element in each of the first and second of said arms, means to heat said heating elements comprising a second source of current connected in shunt with the first and second of said arms, filter means between said first source and the bridge preventing the current from the second source from flowing towards said first source, filter means between said second source and the bridge preventing the current from said first source from flowing toward said second source, means in the amplifier circuit to arrest the heating current, and means exposing said first arm to a reference gas mixture and means exposing said second arm to said flowing gas mixture whereby said meter indicates a parameter of said percentage of said gas in the gas mixture.

References Cited in the file of this patent

UNITED STATES PATENTS

| | | |
|---|---|---|
| 1,715,374 | Krueger | June 4, 1929 |
| 2,045,640 | Fredericks | June 30, 1936 |
| 2,231,166 | Knoedler | Feb. 11, 1941 |
| 2,285,280 | Johnson | June 2, 1942 |
| 2,369,811 | Stuart | Feb. 20, 1945 |
| 2,650,496 | Middleton et al. | Sept. 1, 1953 |

OTHER REFERENCES

Mechanical Measurements by Electrical Methods, H. C. Roberts, Instruments Pub. Co. Inc., Pittsburgh, Pa., 1946, pp. 305–308; 294, 295.

Paramagnetic Oxygen Analyzer, C. Dyer, pub. October 1947, vol. 18, No. 10, Review of Scientific Instruments, pp. 696 to 702.